Aug. 28, 1945.  D. H. FINKLE  2,383,928
SKIN CLAMP
Filed March 22, 1941
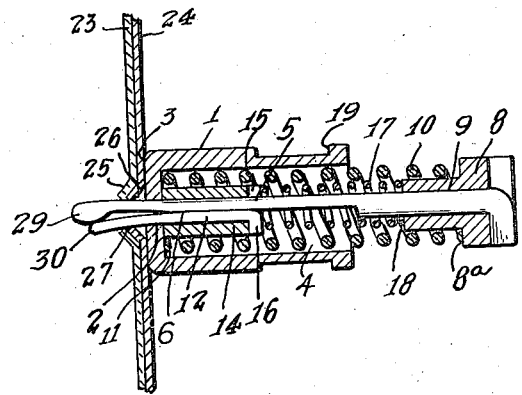
Inventor
Donald H. Finkle
By Lyon & Lyon
Attorneys Patented Aug. 28, 1945

2,383,928

UNITED STATES PATENT OFFICE 2,383,928

SKIN CLAMP

Donald H. Finkle, Los Angeles, Calif.

Application March 22, 1941, Serial No. 384,625

1 Claim. (Cl. 85—5)

My invention relates to a clamp for use in holding two sheets of metal and especially to a clamp for concentrically aligning holes in the two sheets.

In the construction of an airplane fabricated from metal parts or one that has metal skin or covering to the wings or fuselage, the metal skin is placed over structural members and then holes are drilled through the skin and structural members and the rivets placed through the holes. Through the skin of one wing or fuselage, several hundred and sometimes thousands of these rivet holes are necessary, and when filled they must all align to permit the rivets to be placed. The clamp of my invention is for use during this drilling and riveting operation for firmly holding the skin to the structural members and the rivet holes in alignment.

This particular invention is an improvement upon that disclosed in my prior Patent No. 2,240,643, of May 16, 1941.

The preferred form of my present invention can be used in aligning and clamping where the rivet holes have been dimpled so as to leave the final heads of the rivets flush with the exterior of the metal skin. The dimples in the sheets form a truncated cone and, to retain perfect alignment, pressure on all sides of the hole is necessary. The preferred form of my clamp is constructed in general with a body member through which is inserted a pair of complementary half round rods actuated by a spring. One rod has a short section at its outer end which is the full round. This short section acts as a projection to spread the rods apart when in clamping position and forces the outer sides of the rods into a tight fit with the sides of the rivet hole and, because of the spreading action, the two rods cannot pass through the hole and they maintain the material clamped between the sides of the rods and the body member.

It is an object of my invention, therefore, to produce a clamp for use in the fastening of the skin to the body members of an airplane.

Another object of my invention is to produce a clamp which is capable of passing through rivet holes in two or more sheets of material and maintaining the said rivet holes in concentric alignment and at the same time firmly holding the two sheets to be riveted together.

Another object of my invention is to produce a clamp which may be used on dimpled material.

Other objects and advantages of my invention will be apparent in the accompanying description of the preferred embodiment of my invention.

The figure in the drawing is a longitudinal section of clamp constructed in accordance with my invention.

A clamp constructed in accordance with my invention has a body member 1 having a hole 2 passing through one end 3 into the bore 4. A rod 5 which is either a half round rod or a full rod which has been milled or ground round as at 6 passes through the hole 2. A complementary half round rod 12 passes through the hole 2 and is ground off round as at 30. A bushing 14 slidably carried on the rod 5 surrounds the rods 5 and 12 and has a slot 15 into which the end 16 of the rod 12 is bent. The complementary rods 5 and 12 are substantially the same diameter as that of the hole 2 and of the rivet holes 27 in the sheets of material 23 and 24 which it is desired to clamp together and align said rivet holes.

To maintain a clamping action upon the sheets of material 23 and 24, the projection 29 is left upon the rod 5 and when the rod 12 is maintained in its outwardly extending position by the spring 17 and the rod 5 protracted inwardly the end 30 of the rod 12 is spread apart by the projection 29, forming a wedge which clamps the sheets of material 23 and 24 between this wedge and the end 3 of the body member 1. To accomplish this clamping action the rod 5 carries at the opposite end from the projection 29 a cap 8 having a bore 9 therein through which the rod 5 passes. The end of the rod 5 is bent at right angles to prevent withdrawal of the cap. Tension means comprising the spring 10 are positioned against the end 11 of the bore 4 and the shoulder 8a of the cap 8 to prevent the rod 12 from being shoved inwardly of the body. A spring 17 bears against the bushing 14 and shoulder 18 of the cap 8a and maintains the rod yieldably in place. However, the end 11 acts as a stop to the bushing 14 to prevent the rod 12 from moving outwardly from the body member 1. The bushing 14 is held in permanent relation to the rod 12 by the end 16 which is bent over into the slot 15 and held in position by the tension of the spring 17 bearing upon the end of the bushing 14.

In the operation of my clamp a compression tool, such as pliers, operating against a shoulder 19 and the cap 8, is used to compress the springs 10 and 17, forcing out both rods 5 and 12 in the end 3 of the body member. However, the bushing 14 bears against the end 11 of the bore 4, allowing the rod 5 to move beyond the end 30 so that the rod 12 now lies flat against the surface 6. In this position the two rods may be passed through the rivet hole 27 in the sheets of the clamp, whereupon the compression tool is released and the projection 29 slides over the end 30, forming the wedge, and the spring 10 draws this wedge tightly against one side of the sheets of material 23 and 24 and clamps the same against the end 3.

This type of clamp is extremely useful in clamping together sheets of material which have dimpled rivet holes, such as the dimples 25 and 26, as the same does not rely upon any hook or other means which would hook over one corner of the dimpled sheets and tend to tear the same or cause the clamp to assume an angular position in relation to the hole.

A further advantage of my clamp is that it can be used through any thickness of sheet, such as 23 and 24, and the thickness of the material upon which this clamp will work is limited only by rods 5 and 12. An increase in the length of the rods 5 and 12, leaving the projection 29 at the extreme end of rod 5, permits this clamp to be used on any thickness of the material.

While I have described the preferred embodiment of my invention, I do not wish to be limited to any of the specific forms therein set forth, except as described in the appended claim.

I claim:

In a clamp of the class described, a body member, complementary rods slidably mounted in said body member and having a combined diameter of substantially the diameter of the holes to be aligned, one rod having a projection at its end whereby said rods are spaced apart to form a wedge to firmly align said holes, tension means for securely holding said wedge and said body member against opposite sides of the material to be clamped, a bushing slidably mounted upon one of said rods and adapted to permanently engage the other rod, a spring engaging one end of said bushing for actuating the rod engaged thereby, a stop for said bushing whereby one rod may be extended beyond the other to permit the insertion of said rods in said holes.

DONALD H. FINKLE.